United States Patent
Hayashi (10) Patent No.: US 10,616,526 B2
(45) Date of Patent: Apr. 7, 2020

(54) IMAGE RECORDING APPARATUS, IMAGE RECORDING METHOD, AND PROGRAM

(71) Applicant: SHARP KABUSHIKI KAISHA, Sakai, Osaka (JP)

(72) Inventor: Hiroyuki Hayashi, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 0 days.

(21) Appl. No.: 16/419,469

(22) Filed: May 22, 2019

(65) Prior Publication Data

US 2019/0364242 A1   Nov. 28, 2019

(30) Foreign Application Priority Data

May 28, 2018 (JP) .................. 2018-101560

(51) Int. Cl.
*H04N 5/91* (2006.01)
*H04N 19/172* (2014.01)
*G11B 27/34* (2006.01)
*G11B 20/00* (2006.01)
*H04N 19/139* (2014.01)

(52) U.S. Cl.
CPC ......... *H04N 5/91* (2013.01); *G11B 20/00007* (2013.01); *G11B 27/34* (2013.01); *H04N 19/139* (2014.11); *H04N 19/172* (2014.11); *G11B 2020/00072* (2013.01)

(58) Field of Classification Search
CPC ...... H04N 5/91; H04N 19/139; H04N 19/172; G11B 20/00007; G11B 27/34
See application file for complete search history.

(56) References Cited

U.S. PATENT DOCUMENTS

2013/0051458 A1* 2/2013 Kitahara .............. H04N 19/172
   375/240.03
2014/0219251 A1* 8/2014 Kato ................... H04W 36/023
   370/331

FOREIGN PATENT DOCUMENTS

JP   H07-284058 A   10/1995

* cited by examiner

*Primary Examiner* — Mishawn N. Hunter
(74) *Attorney, Agent, or Firm* — ScienBiziP, P.C.

(57) ABSTRACT

A series of frames forming the moving image includes intra-frame predictive frames, inter-frame predictive frames, and a non-reference frame at predetermined intervals. A still image corresponding to a next non-reference frame is encoded when a waiting period from an instruction point in time at which a still image is instructed to be captured to the next non-reference frame is equal to or less than a predetermined time. An image of a current frame at the instruction point in time as a non-reference frame is encoded, and a still image corresponding to the current frame is encoded when the waiting period exceeds the predetermined time.

8 Claims, 5 Drawing Sheets

IMAGE RECORDING APPARATUS, IMAGE RECORDING METHOD, AND PROGRAM

BACKGROUND OF THE INVENTION

Field of the Invention

The present invention relates to an image recording apparatus, an image recording method and a program for simultaneously recording a moving image and a still image.

Description of Related Art

An image recording method for simultaneously recording a moving image and a still image of a specific scene in an image recording apparatus which records captured images as digital data has been proposed.

For example, in a recording method disclosed in Patent Document 1, a predetermined operation is received during recording of a moving image, an I-picture is generated when the operation is performed and records the generated I-picture as a still image.

An I-picture is a frame image which is encoded through intra-frame prediction in the frame thereof without referring to other frame images among a plurality of frame images constituting a moving image. When a moving image is reproduced from a frame corresponding to a recorded still image, the frame corresponding to the still image is an I-picture and thus a throughput necessary for the reproduction process decreases to below a throughput necessary for reproduction from other frames.

PATENT DOCUMENT

[Patent Document 1] Japanese Unexamined Patent Application, First Publication No. H7-284058

SUMMARY OF THE INVENTION

Meanwhile, it is necessary to prevent the capacity of encoded data (code amount) obtained according to encoding from exceeding a buffer capacity of a decoder when a moving image is reproduced. Further, the capacity of encoded data of an I-picture is generally greater than the capacity of encoded data of frame images (for example, a B-picture and a P-picture) which are encoded through inter-frame prediction with reference to other frames. In the recording method disclosed in Patent Document 1, a code amount increases because an I-picture is generated at a timing indicated according to an operation and encoded data thereof is recorded. As a result, the code amount of that part exceeds a buffer capacity of a decoder and thus a moving image may not be correctly reproduced.

An object of the present invention devised in view of the aforementioned circumstances is to provide an image recording apparatus, an image recording method and a program capable of minimizing a code amount increase.

The present invention is made to solve the above-described problem. One aspect of the present invention is an image recording apparatus including: a moving image encoder which encodes an image of each frame forming a moving image; a still image encoder which encodes a still image; and a controller, wherein a series of frames forming the moving image includes intra-frame predictive frames encoded by the moving image encoder through intra-frame prediction and inter-frame predictive frames encoded through inter-frame prediction with reference to images of other frames as reference images, the series including a non-reference frame which is not referred to in inter-frame prediction of a previous inter-frame predictive frame at predetermined intervals in the intra-frame predictive frames, and wherein the controller causes the still image encoder to encode a still image corresponding to a next non-reference frame when a waiting period from an instruction point in time at which a still image is instructed to be captured to the next non-reference frame is equal to or less than a predetermined time, causes the moving image encoder to encode an image of a current frame at the instruction point in time as a non-reference frame and causes the still image encoder to encode a still image corresponding to the current frame when the waiting period exceeds the predetermined time, or causes the still image encoder to encode a still image corresponding to the next non-reference frame when the waiting period is less than the predetermined time, and the controller causes the moving image encoder to encode the image of the current frame as a non-reference frame and causes the still image encoder to encode the still image corresponding to the current frame when the waiting period is equal to or greater than the predetermined time.

According to the present invention, it is possible to prevent a code amount from increasing.

DETAILED DESCRIPTION OF THE INVENTION

Hereinafter, an image recording apparatus, an image recording method and a program according to an embodiment of the present invention will be described with reference to the drawings.

Figure 1:
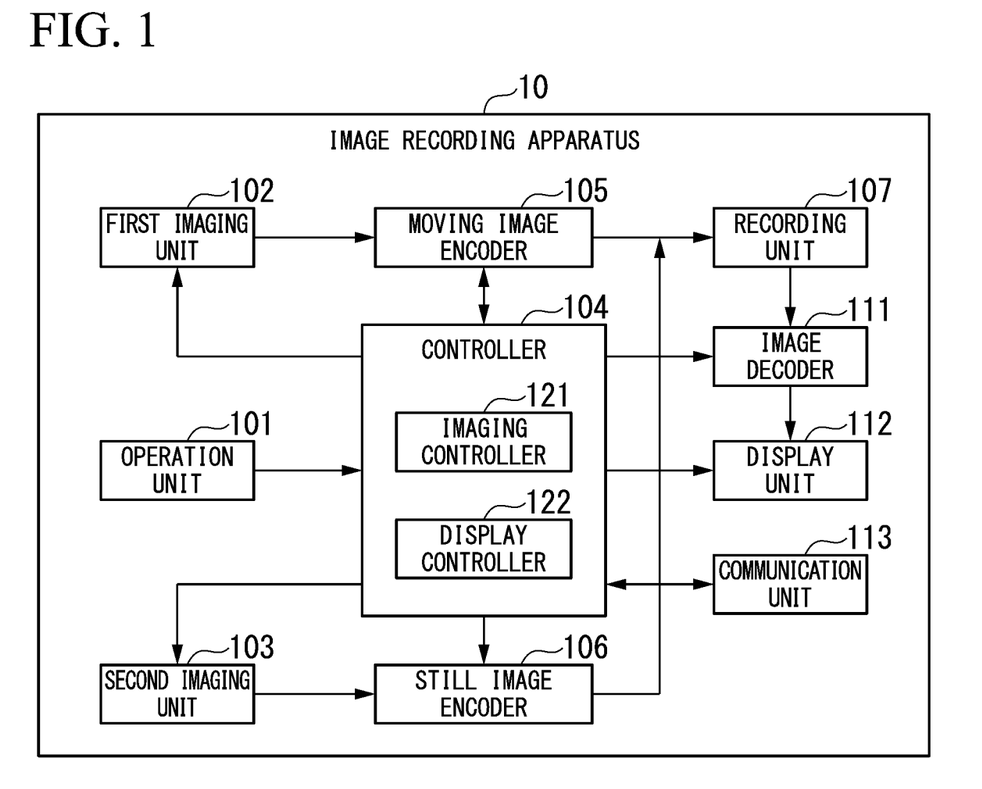
FIG. 1 is a block diagram showing an example of a functional configuration of an image recording apparatus according to the present embodiment.

FIG. 1 is a block diagram showing an example of a functional configuration of an image recording apparatus 10 according to the present embodiment.

The image recording apparatus 10 captures an image, encodes image data representing the captured image and records encoded data obtained through encoding. The image recording apparatus 10 can capture and record a moving image and a still image. Further, the image recording apparatus 10 may capture a still image during capturing of a moving image. The image recording apparatus 10 may be a dedicated imaging apparatus (camera) or may be implemented as an electronic device having other functions, for example, a multi-function mobile phone, a tablet terminal device or the like.

The image recording apparatus 10 records a still image of a next non-reference frame when a period from an instruction point in time at which a still image is instructed to be captured to the next non-reference frame (which will be described later) is within a predetermined period. When the period from the instruction point in time to the next non-reference frame exceeds the predetermined period, the image recording apparatus 10 records a frame image at the instruction point in time as a still image and causes moving image encoding to be performed using the frame image as a non-reference frame.

The image recording apparatus 10 includes an operation unit 101, a first imaging unit 102, a second imaging unit 103, a controller 104, a moving image encoder 105, a still image encoder 106, a recording unit 107, an image decoder 111, a display unit 112, and a communication unit 113.

The operation unit 101 receives an operation of a user, generates an operation signal according to the received operation and outputs the generated operation signal to the controller 104. For example, the operation unit 101 may include members which receive an operation, such as a button, a dial and a lever. The operation unit 101 may be a touch sensor implemented by being integrated with the display unit 112. Functions of the image recording apparatus 10 are controlled by operating the operation unit 101. For example, capturing of a moving image or stopping of capturing of a moving image, capturing of a still image, display of a recorded moving image or stopping of display of a recorded moving image, display of a still image, and the like may be instructed.

The first imaging unit 102 captures an image representing a subject present within a visual field range and outputs first image data representing the captured image to the moving image encoder 105. In the following description, an image captured by the first imaging unit 102 is referred to as a first image. The first image is a moving image formed of images captured with respect to respective predetermined frames. The first imaging unit 102 includes an optical system, an imaging element, and a signal processor (which are not shown). The optical system includes an object lens. The object lens causes image light input thereto to converge and causes the convergent light to be input to the surface of the imaging device. The imaging element is configured with a plurality of cells arranged at predetermined intervals on the surface thereof in the horizontal direction and the vertical direction. Here, the horizontal direction and the vertical direction are directions of one side and another side of an imaging area formed within a plane perpendicular to the optical axis of the optical system. The direction of the other side is perpendicular to the direction of the one side. A cell corresponds to one pixel and has a light-receiving element. A light-receiving element generates an electrical signal having a voltage in response to an intensity of received light as a signal value. For example, the light-receiving element may be a charge coupled device (CCD), a complementary-metal-oxide-semiconductor (CMOS), or the like.

The signal processor generates first image data representing a first image at predetermined frame intervals (for example, 1/30 of a second). The first image is represented as signal values of respective pixels. The optical system of the first imaging unit 102 has a wide angle of view (which is also called a viewing angle, for example, 135°). Further, the optical system of the first imaging unit 102 may have a wide range of depth of field and realize pan-focus (which is also called deep focus) without performing focusing control (which is also called automatic focusing (AF) control, focusing, and the like).

The second imaging unit 103 captures an image and outputs second image data representing the captured image to the still image encoder 106. In the following description, an image captured by the second imaging unit 103 is referred to as a second image. The second image is a still image at a point in time at which imaging is instructed. The second imaging unit 103 includes an optical system, an imaging element and a signal processor like the first imaging unit 102. However, the angle of view of the optical system of the second imaging unit 103 may be narrower than that of the optical system of the first imaging unit 102. Further, the depth of field of the optical system of the second imaging unit 103 may be less than that of the optical system of the first imaging unit 102.

The second imaging unit 103 may include a focusing controller (not shown) which causes a distance between an object lens and the imaging element to be variable. The signal processor of the second imaging unit 103 generates second image data representing a second image captured by the imaging element and outputs the second image data to the focusing controller. The second image is represented as signal values of respective pixels. The focusing controller performs focusing control by calculating a focusing evaluation value indicating a degree of focusing (hereinafter referred to as a focusing degree) on the basis of a signal value of each pixel represented by the second image data and changing the position of the object lens such that the focusing degree indicated by the focusing evaluation value further increases. For example, a focusing evaluation value may be a ratio of the intensity of a high-frequency component equal to or higher than a predetermined spatial frequency of the second image to the intensity of a low-frequency component lower than the predetermined spatial frequency. The focusing controller specifies a position of the object lens at which the focusing degree is maximized. A focusing completion signal representing completion of focusing control is output to the signal processor of the second imaging unit 103. The signal processor of the second imaging unit 103 outputs a duration of a predetermined shutter speed (which is also called an exposure time) and the second image data representing the second image obtained by receiving light to the still image encoder 106 when an imaging control signal for instructing a still image to be captured is input from an imaging controller 121.

Further, the imaging element of the second imaging unit 103 may capture the second image irrespective of whether or not an instruction for imaging is issued. In addition, the focusing controller may perform focusing control for the captured second image.

The controller 104 controls the operation of each component of the image recording apparatus 10. The controller 104 includes the imaging controller 121 and a display controller 122. The controller 104 may be configured as a computer including one or a plurality of processors (for example, central processing units (CPUs)). The controller 104 may execute processes instructed through commands described in programs stored in advance in a storage medium to realize functions of the imaging controller 121 and the display controller 122. The programs for realizing the functions of these components may be recorded in a computer readable recording medium and a processor may cause a computer system to read and execute the programs recorded in the recording medium.

The imaging controller 121 controls a function pertaining to imaging on the basis of an operation signal input from the operation unit 101. For example, the imaging controller 121 may control capturing of a moving image or stopping of capturing of a moving image by the first imaging unit 102 and the moving image encoder 105, or capturing of a still image by the second imaging unit 103 and the still image encoder 106 on the basis of an operation signal.

The display controller 122 controls a function pertaining to display on the basis of an operation signal input from the operation unit 101. For example, the display controller 122 may control display of a moving image or stopping of display of a moving image, stopping of a still image, and the like by the image decoder 111 and the display unit 112, and the like on the basis of an operation signal. An example of processes executed by the imaging controller 121 and the display controller 122 will be described later.

The moving image encoder 105 performs an encoding process on first image data input from the first imaging unit 102 to generate first encoded data. For example, an encoding method corresponding to a video decoding method designated in any of standards such as Moving Picture Expert Group (MPEG)-1, MPEG-4 Advanced Video Coding (AVC) and MPEG-H High Efficiency Video Coding (HEVC) may be used in the encoding process. It is possible to compress the amount of information of the first image by performing encoding using such an encoding method. The moving image encoder 105 sequentially records the generated first encoded data in the recording unit 107.

The still image encoder 106 performs an encoding process on second image data input from the second imaging unit 103 to generate second encoded data. Second image data representing a still image of one frame is obtained through a one-time encoding process. For example, a still image encoding method designated in any of standards such as Joint Photographic Experts Group (JPEG), Portable Network Graphics (PNG), Graphics Interchange Format (GIF) and High Efficiency Image File Format (HEIF) may be used in the encoding process. It is possible to compress the amount of information of the second image by performing encoding using such a still image encoding method. The still image encoder 106 records the generated second encoded data in the recording unit 107. The still image encoder 106 may associate the second encoded data with a frame of the first image captured simultaneously with the second image when the second encoded data is recorded in the recording unit 107.

The recording unit 107 records the first encoded data representing the first image and the second encoded data representing the second image. The recording unit 107 may be a nonvolatile memory such as a flash memory in which recorded data is not erased even when power supply is stopped. The recording unit 107 may be fixed to a housing (not shown) of the image recording apparatus 10 or may be composed of a recording medium detachable from the housing and an interface in which the recording medium is mounted. For example, a secure digital (SD) memory card may be employed as the detachable recording medium.

The image decoder 111 decodes the first encoded data and the second encoded data according to control of the controller 104. For example, when an operation signal indicating display of an image and the image which is a display target is input from the operation unit 101, the controller 104 generates a decoding control signal indicating decoding of first encoded data or second encoded data representing the image. The image decoder 111 reads the first encoded data or the second encoded data represented by the decoding control signal from the controller 104 from the recording unit 107.

When the decoding control signal indicates the first encoded data, the image decoder 111 decodes the first encoded data to generate first image data and outputs the generated first image data to the display unit 112. It is desirable that a decoding method used to decode the first encoded data correspond to a moving image encoding method used to encode the first encoded data.

When the decoding control signal indicates the second encoded data, the image decoder 111 decodes the read second encoded data to generate second image data and outputs the generated second image data to the display unit 112.

It is desirable that a decoding method used to decode the second encoded data correspond to a still image encoding method used to encode the second encoded data.

The display unit 112 displays various types of visual information on the basis of control of the controller 104. For example, the display unit 112 may be any of a liquid crystal display (LCD), an organic electro-luminescence display (OLED) and the like.

When the first image data is input from the image decoder 111, the display unit 112 displays a first image (moving image) represented by the first image data. When the second image data is input from the image decoder 111, the display unit 112 displays a second image (still image) represented by the second image data.

Meanwhile, when a display control signal indicating display of the first image is input from the controller 104 in response to an input of an operation signal indicating display of the first image from the operation unit 101, the first imaging unit 102 may output the first image data to the display unit 112. The display unit 112 displays the first image (moving image) during capturing of the first image.

The communication unit 113 performs communication with other devices in a wireless or wired manner using a predetermined communication method. For example, the communication unit 113 may be a communication interface. For example, when an operation signal indicating transmission of an image, the image which is a transmission target and a device which is a transmission destination is input from the operation unit 101, the controller 104 generates a communication control signal indicating transmission of first encoded data or second encoded data representing the image to the device which is the transmission destination. When the communication control signal is input from the controller 104, the communication unit 113 reads data of one or both of the first encoded data and the second encoded data indicated by the communication control signal from the recording unit 107 and transmits the read data to the device (not shown) which is the transmission destination indicated by the communication control signal. The device which is the transmission destination may include a decoder which decodes data acquired from the image recording apparatus 10 and a display unit which displays an image based on the image data acquired through decoding.

Operation Example

Next, an operation example of the image recording apparatus 10 according to a user operation will be described.

Figure 2:
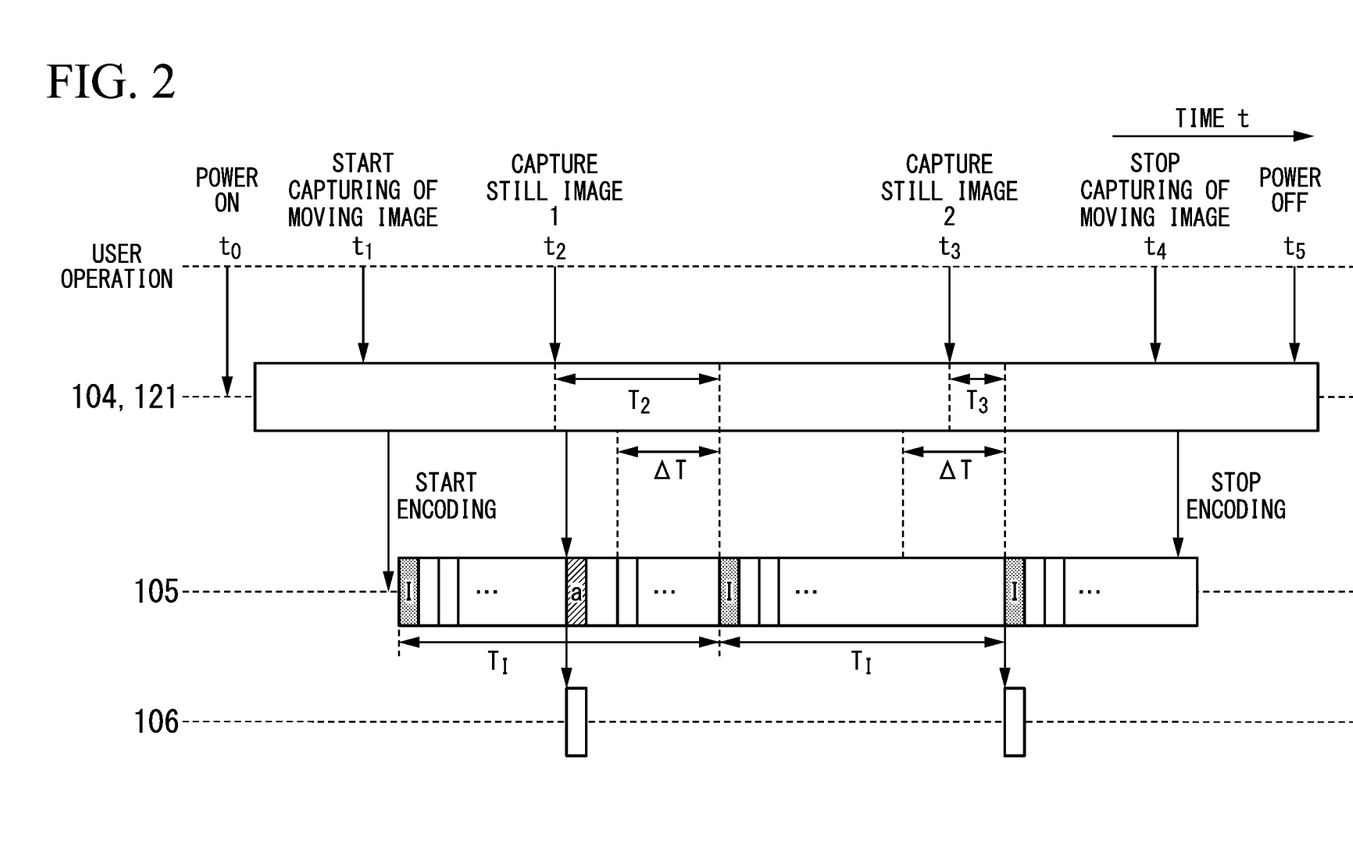
FIG. 2 is an explanatory diagram showing an operation example of the image recording apparatus according to the present embodiment.

An example illustrated in FIG. 2 mainly shows an operation of the image recording apparatus 10 pertaining to imaging. The horizontal axis of FIG. 2 represents time t. FIG. 2 shows that time elapses to the right. In FIG. 2, user operations and states of the controller 104 (imaging controller 121), the moving image encoder 105 and the still image encoder 106 are illustrated from the top to the bottom.

When a user operation through the operation unit 101 instructs power supply to be started (power ON) at a time to, a power unit (not shown) of the image recording apparatus 10 starts power supply to the components including the controller 104. Then, the components are activated.

When an operation signal for instructing capturing of a moving image to be started is input through the operation unit 101 according to a user operation at a time $t_1$, the imaging controller 121 of the controller 104 outputs an imaging control signal indicating start of capturing of a moving image to the first imaging unit 102. The first imaging unit 102 starts capturing of a first image which is a moving image and starts output of first image data representing the captured first image to the moving image encoder 105. The moving image encoder 105 starts encoding of the first image data input from the first imaging unit 102. The moving image encoder 105 sequentially records first encoded data obtained through encoding in the recording unit 107.

A moving image is generally represented as a series of a plurality of images. An individual image is called a frame. A series of a plurality of frames includes an intra-frame predictive frame and an inter-frame predictive frame as frame types. The intra-frame predictive frame is a frame which is a target for which intra-frame prediction is executed in encoding or decoding. Intra-frame prediction is a process of determining signal values of pixels of a processing target from signal values of processed pixels in a frame which is the processing target without reference to other frame images and is also called intra-prediction. The intra-frame predictive frame is also called an I-frame. An I-frame image corresponds to the aforementioned I-picture.

The inter-frame predictive frame is a frame which is a target for which inter-frame prediction is executed in encoding or decoding. Inter-frame prediction is a process of determining a signal value of each pixel with respect to an image of a frame which is a processing target with reference to decoded images of other processed frames and is also called inter-prediction. Inter-frame prediction includes forward prediction and bidirectional prediction. Forward prediction is a prediction method in which a frame which is a reference destination is a previous frame of a processing target frame. Bidirectional prediction is a prediction method in which frames which are reference destinations are both a previous frame and a future frame with respect to a processing target frame. A frame which is a forward prediction target and an image with respect to the frame are respectively referred to as a P-frame and P-picture. A frame which is a bidirectional prediction target and an image with respect to the frame are respectively referred to as a B-frame and B-picture. Meanwhile, a prediction process for a B-frame in an encoding or decoding procedure may refer to a plurality of previous frames as reference frames.

The moving image encoder 105 performs an encoding process using a frame group including two or more predetermined frames as a unit on the basis of the above-described encoding method. Each group is composed of a series of individual frame types. This group may be called a group of pictures (GOP) in MPEG-4 AVC or a structure of pictures (SOP) in MPEG-H HEVC, for example. Each group includes at least one non-reference frame. A non-reference frame is a kind of I-frame and is not referred to during inter-frame prediction in inter-frame predictive frames in a previous group. The non-reference frame is also called an instantaneous decoder refresh (IDR) frame. The non-reference frame is usually a leading frame of the group. A frame other than the non-reference frame in the group is any of an I-frame, a P-frame and a B-frame. The non-reference frame may be referred to in inter-frame prediction in other frame predictive frames of the group to which the non-reference frame belongs. "I" in FIG. 2 represents a non-reference frame. In general, an I-picture can be encoded only using encoded data thereof but the amount of information thereof is larger than the amount of information of encoded data of a P-frame or a B-frame. To minimize the amount of information of encoded data to increase a compression rate, the number of I-pictures in a group is usually less than the number of P-pictures or the number of B-pictures.

However, a larger number of I-frames tends to enhance the picture quality of a decoded image obtained by decoding encoded data and tolerance to errors mixed into the encoded data.

In the present embodiment, predetermined reference image information is set in advance in the moving image encoder 105 and an encoding process is repeated for respective groups using the predetermined reference image information unless there is an instruction according to a particular operation or the like. The reference image information is information representing types of individual frames in a group composed of a predetermined number of frames. The reference image information includes reference destination frame information representing a reference destination frame with respect to a frame which is a P-frame or a B-frame. Accordingly, a non-reference frame is repeated at a predetermined repetition interval $T_1$ unless there is a particular instruction.

Next, a case in which an operation signal for instructing a still image to be captured (still image capturing 1) according to a user operation is input through the operation unit 101 at a time $t_2$ will be assumed. Here, the imaging controller 121 determines that a still image has been instructed to be captured. When a period from an instruction point in time at which a still image is instructed to be captured to the next DR frame (hereinafter referred to as an IDR frame waiting period) is equal to or less than a predetermined period, the imaging controller 121 causes the second imaging unit 103 to capture a still image at the time of the IDR frame.

Further, the moving image encoder 105 specifies a processing target frame order at that point in time in a repetition interval of a frame pertaining to the reference image information set therein. The moving image encoder 105 can determine an IDR frame waiting period $T_2$ on the basis of the specified order within the repetition interval. The moving image encoder 105 notifies the imaging controller 121 of the determined DR frame waiting period $T_2$. In addition, when the processing target frame type at that point in time is the IDR frame, the moving image encoder 105 outputs IDR information representing that the frame type is the IDR frame to the controller 104.

When the DR frame waiting period $T_2$ input from the moving image encoder 105 exceeds a threshold value $\Delta T$ of an IDR frame waiting period set in advance in the imaging controller 121, the imaging controller 121 causes the second imaging unit 103 to record an image of a frame at that point in time as a still image without waiting for the next DR frame. Here, the imaging controller 121 outputs an imaging instruction signal to the second imaging unit 103. The second imaging unit 103 generates second image data representing a second image and outputs the generated second image data to the still image encoder 106 when the imaging instruction signal is input from the imaging controller 121. The still image encoder 106 performs an encoding process on the second image data input from the second imaging unit 103 to generate second encoded data and records the generated second encoded data in the recording unit 107.

It is desirable that the threshold value $\Delta T$ of the IDR frame waiting period be within a delay time (for example, 0.2 to 1.0 seconds) permitted from still image capture instruction to actual capturing.

Concurrently, the imaging controller 121 sets a frame a at that point in time as an DR frame and causes the moving image encoder 105 to encode the second image data with respect to the frame. Here, the imaging controller 121 outputs an IDR insertion request signal to the moving image encoder 105. The DR insertion request signal is a signal for instructing a frame to be encoded as an IDR frame.

When the DR insertion request signal is input from the imaging controller 121, the moving image encoder 105 determines a frame which becomes an encoding target at that point in time as an IDR frame and encodes the frame as the IDR frame. In addition, the moving image encoder 105 associates first encoded data obtained by encoding the image of the frame with second reference image information having the frame as a leading frame and records the associated data and information in the recording unit 107. The second reference image information about each of a plurality of types of the number of frames may be set in advance in the moving image encoder 105. The number of frames pertaining to the second reference image information corresponds to the number of frames within the IDR waiting period, which is greater than the threshold value $\Delta T$ of the IDR waiting period and less than the repetition interval $T_1$.

The moving image encoder 105 identifies the number of frames from a frame through which the IDR insertion request signal is input to a frame immediately before an IDR frame of the next repetition interval, selects second reference image information according to the recognized number of frames and stores a code representing the selected second reference image information in the recording unit 107 as a part of the first encoded data. The moving image encoder 105 performs an encoding process using a prediction method corresponding to the frame type indicated by the selected second reference image information with respect to each frame within the current repetition interval from that point in time. When the prediction method is inter-frame prediction, the moving image encoder 105 performs inter-frame prediction using a reference destination frame set for the target frame represented by the second reference image information. In addition, the moving image encoder 105 may resume the encoding process from the next IDR frame using predetermined reference image information about a repetition interval set in advance.

Next, a case in which an operation signal for instructing a still image to be captured (still image capturing 2) is input through the operation unit 101 according to a user operation at a time $t_3$ will be assumed. At this time, the imaging controller 121 also determines that a still image has been instructed to be captured. The imaging controller 121 causes the second imaging unit 103 to capture a still image at the time of the next DR frame when a period from an instruction point in time that is a point in time at which a still image is instructed to be captured to the next DR frame is equal to or less than the predetermined period.

More specifically, when an IDR frame waiting period $T_3$ input from the moving image encoder 105 is equal to or less than the predetermined IDR frame waiting period $\Delta T$ set in advance in the imaging controller 121, the imaging controller 121 waits until a processing target frame becomes the next IDR frame. Here, the imaging controller 121 sets a waiting state of IDR information from the moving image encoder 105. The imaging controller 121 waits for an input of IDR information from the moving image encoder 105 while the IDR information waiting state has been set. The imaging controller 121 cancels the set IDR information waiting state when IDR information is input from the moving image encoder 105. Thereafter, the imaging controller 121 outputs an imaging instruction signal for instructing a still image to be captured to the second imaging unit 103.

When the imaging instruction signal is input from the imaging controller 121, the second imaging unit 103 captures a second image after the elapse of the IDR frame waiting period $T_3$. The second imaging unit 103 generates second image data representing the captured second image and outputs the generated second image data to the still image encoder 106. The still image encoder 106 performs an encoding process on the second image data input from the second imaging unit 103 to generate second encoded data and records the generated second encoded data in the recording unit 107.

Subsequently, when an operation signal for instructing capturing of a moving image to be stopped is input through the operation unit 101 according to a user operation at a time $t_4$, the imaging controller 121 outputs an imaging control signal for instructing capturing of a moving image to be stopped to the second imaging unit 103. When the imaging control signal is input from the imaging controller 121, the second imaging unit 103 stops capturing of the second image which is a moving image and stops output of the second image data representing the second image. The imaging controller 121 outputs an encoding control signal for instructing an encoding process to be stopped to the moving image encoder 105. The moving image encoder 105 stops the encoding process for the second image data when the encoding control signal is input from the imaging controller 121.

When a user operation applied to the operation unit 101 instructs power supply to be stopped (power OFF) at a time t5, the controller 104 stops the operations of the components and the power supply unit stops power supply to the components including the controller 104 such that the operations of the components are stopped.

(Image Recording Procedure)

Next, an image recording procedure according to the present embodiment will be described.

Figure 3:
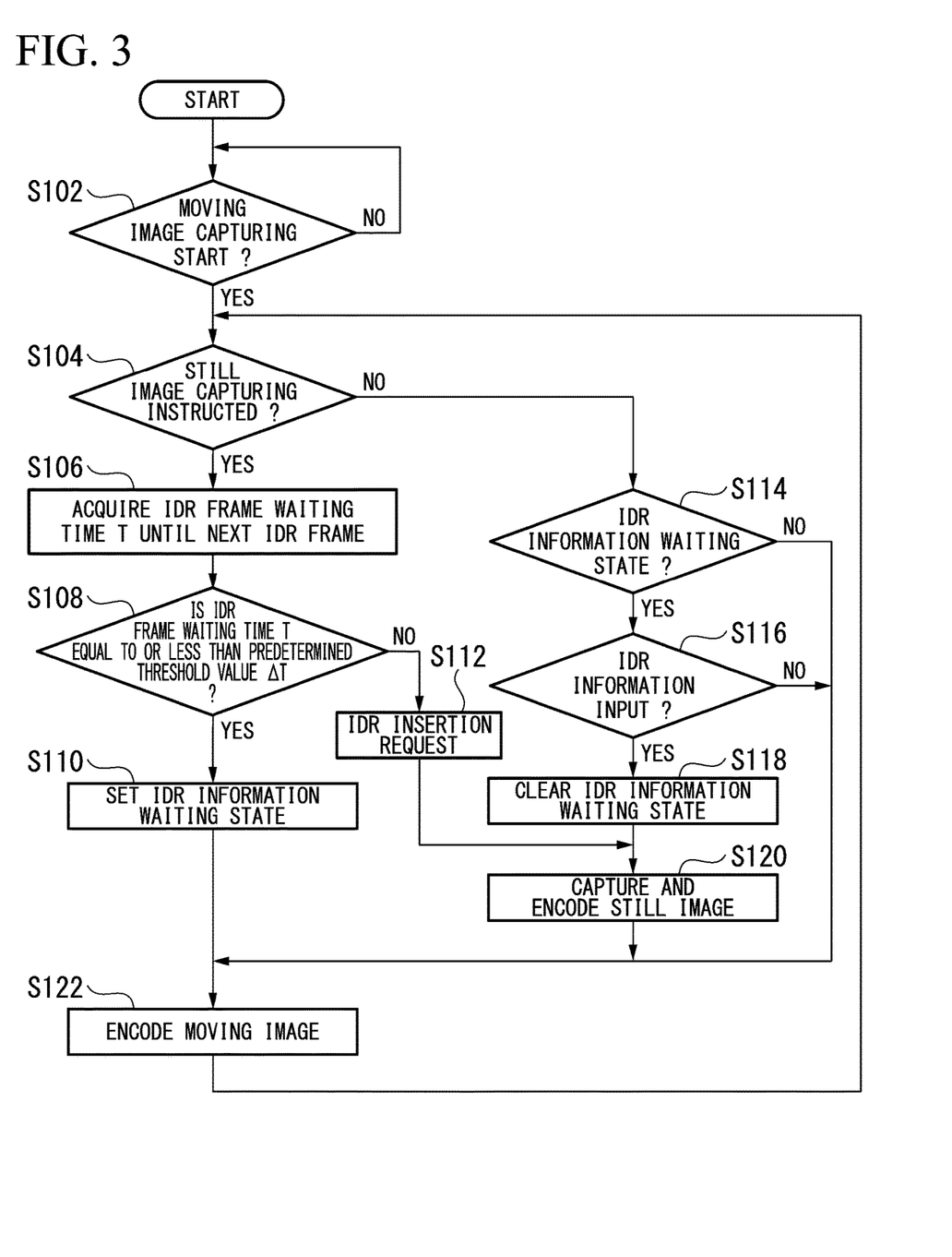
FIG. 3 is a flowchart showing an example of an image recording process according to the present embodiment.

FIG. 3 is a flowchart showing an example of the image recording procedure according to the present embodiment.

(Step S102) The imaging controller 121 determines whether capturing of a moving image has been instructed to be started on the basis of an operation signal input from the operation unit 101. When capturing has been instructed to be started (YES in step S102), the procedure proceeds to the process of step S104. When capturing has not been instructed to be started (NO in step S102), the process of step S102 is repeated.

(Step S104) The imaging controller 121 determines whether still image capturing has been instructed to be started on the basis of an operation signal input from the operation unit 101. When capturing has been instructed (YES in step S104), the procedure proceeds to the process of step S106. When capturing has not been instructed (NO in step S104), the procedure proceeds to the process of step S114.

(Step S106) The imaging controller 121 acquires an IDR frame waiting period T from the first imaging unit 102. Then, the procedure proceeds to the process of step S108.

(Step S108) The imaging controller 121 determines whether the IDR frame waiting period T is equal to or less than a predetermined threshold value $\Delta T$ of the IDR frame waiting period. When the IDR frame waiting period T is equal to or less than the predetermined threshold value $\Delta T$ (YES in step S108), the procedure proceeds to the process of step S110.

When the IDR frame waiting period T exceeds the predetermined threshold value ΔT (NO in step S108), the procedure proceeds to the process of step S112.

(Step S110) The imaging controller 121 sets a waiting state of IDR information from the moving image encoder 105. Then, the procedure proceeds to the process of step S122.

(Step S112) The imaging controller 121 outputs an IDR insertion request signal to the moving image encoder 105. When the IDR insertion request signal is input from the imaging controller 121, the moving image encoder 105 determines a frame which is an encoding target at that point in time as an IDR frame. Then, the procedure proceeds to the process of step S120.

(Step S114) The imaging controller 121 determines whether a waiting state of DR information from the moving image encoder 105 has been set at that point in time. When the waiting state has been set (YES in step S114), the procedure proceeds to the process of step S116. When the waiting state has not been set (NO in step S114), the procedure proceeds to the process of step S122.

(Step S116) The imaging controller 121 determines whether IDR information has been input from the moving image encoder 105. When the IDR information has been input (YES in step S116), the procedure proceeds to the process of step S118. When the IDR information has not been input (NO in step S116), the procedure proceeds to the process of step S122.

(Step S118) The imaging controller 121 cancels (clears) the set IDR information waiting state. In a state in which the waiting state has been canceled, the imaging controller 121 may reject IDR information from the moving image encoder 105 instead of waiting for it. Then, the procedure proceeds to the process of step S120.

(Step S120) The imaging controller 121 outputs an imaging control signal indicating capturing of a still image to the second imaging unit 103. The second imaging unit 103 captures a second image. The still image encoder 106 encodes second image data representing the second image and records second encoded data obtained through encoding to the recording unit 107. Then, the procedure proceeds to the process of step S122.

(Step S122) The moving image encoder 105 encodes first encoded data input from the first imaging unit 102 and records first encoded data obtained through encoding in the recording unit 107. Thereafter, transition of the processing target frame to the next frame occurs and the procedure proceeds to the process of step S104.

Although a case in which the moving image encoder 105 autonomously notifies the imaging controller 121 of the IDR frame waiting period has been exemplified in the examples of FIG. 2 and FIG. 3, the present invention is not limited thereto. The imaging controller 121 may output a first inquiry signal indicating inquiry about the IDR frame waiting period to the moving image encoder 105 when an operation signal for instructing a still image to be captured is input.

The moving image encoder 105 notifies the imaging controller 121 of the IDR frame waiting period T determined at that point in time as a response to the first inquiry signal.

(Image Display)

Next, an example of display of an image captured by the image recording apparatus 10 will be described.

Figure 4:
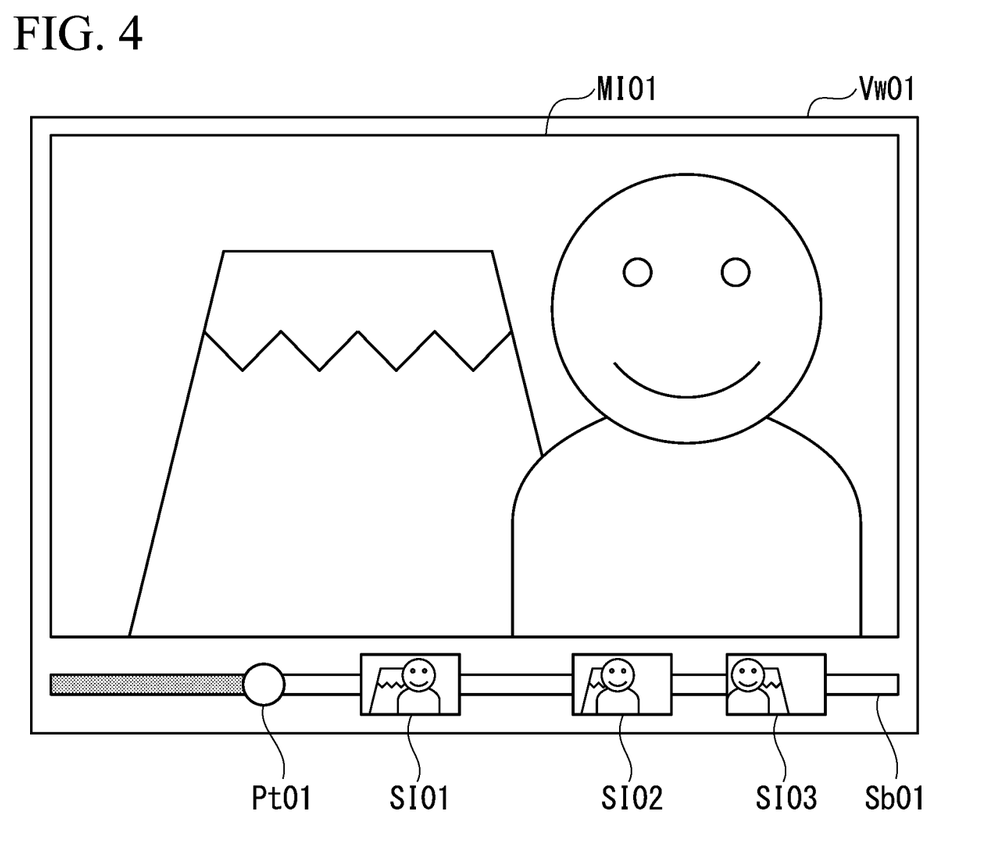
FIG. 4 is a diagram showing an example of a screen display according to the present embodiment.

FIG. 4 is a diagram showing an example of display of an image captured by the image recording apparatus 10 according to the present embodiment.

When an operation signal for instructing a moving image to be displayed is input, the display controller 122 causes the display unit 112 to display a predetermined viewer Vw01 and causes the image decoder 111 to read first encoded data representing the moving image indicated through the operation signal from the recording unit 107. The image decoder 111 reads second encoded data representing a still image associated with the first encoded data and stored and time information representing a time associated with the first encoded data. The time information may be a time based on the time of the beginning of the moving image represented by the first encoded data, that is, a playback point in time represented as an elapsed time from the beginning. The image decoder 111 decodes the read second encoded data to generate second image data representing the still image. The generated second image data and the time information are output to the display controller 122. The image decoder 111 uses a decoding method corresponding to the encoding method used for encoding when the second encoded data is decoded.

The viewer Vw01 is mostly occupied by a display area for displaying a moving image MI01, and a progress bar Sb01 is displayed at a lower area that does not overlap with the display area. The progress bar Sb01 is a screen part for visually representing a moving image playback state and indicating a playback start point according to an operation. In the example shown in FIG. 4, a longitudinal direction of the progress bar Sb01 is the horizontal direction and the length thereof represents a playback time of an entire moving image. The progress bar Sb01 has a pointer Pt01. The display controller 122 displays the pointer Pt01 at a position corresponding to a playback point in time notified of by the image decoder 111. A distance from the left end of the progress bar Sb01 to the position at which the pointer Pt01 is displayed represents an elapsed time from the beginning of the moving image to the playback point in time. In addition, the display controller 122 changes the display position of the pointer Pt01 to a position indicated by an operation signal input from the operation unit 101 and instructs the moving image to be played from a playback point in time corresponding to the changed display position.

The display controller 122 generates reduced images obtained by reducing second images represented by second image data input from the image decoder 111 to a predetermined size as thumbnails during the moving image playback time indicated by the progress bar Sb01. The display controller 122 displays the generated thumbnails at positions corresponding to times indicated by the input time information. Display positions of thumbnails SI01, SI02 and SI03 shown in FIG. 4 are positions corresponding to times at which second images have been captured. First images of frames at these times represent image patterns which are common with the second images.

When a depression of any of the displayed thumbnails is detected, the display controller 122 causes the image decoder 111 to start decoding of the first encoded data from the playback point in time corresponding to the position of that thumbnail. Here, depression includes input of an operation signal indicating coordinates within the relevant display region from the operation unit 101. The image decoder 111 sequentially outputs first image data obtained by decoding the first encoded data to the display unit 112. The display unit 112 displays a first image (moving image) represented by the first image data input from the image decoder 111.

Accordingly, when a user indicates a thumbnail according to an operation, the first image which is a moving image can be displayed on the display unit 112 from a playback point in time corresponding to the display position of the indicated thumbnail. A frame of the first image at a point in time at which the second image which is a base of the thumbnail has been encoded and recorded becomes an IDR frame. Accordingly, the image decoder 111 can decode the first encoded data following the IDR frame having the IDR frame as the beginning. Here, the aforementioned reference image information and the second reference image information are set in advance in the image decoder 111, and second reference image information indicated through a code included in the first encoded data is identified. The image decoder 111 decodes the first encoded data for each frame with reference to the identified second reference image information.

Here, the image decoder 111 can decode the first encoded data from the IDR frame without using encoded data of a previous frame prior to the IDR frame. When the image decoder 111 decodes first encoded data of an inter-frame predictive frame, the image decoder 111 must include a data buffer for temporarily storing a part of the first encoded data which is a processing target. In the present embodiment, since the process waits until a processing target frame becomes the next IDR frame when the IDR frame waiting period is equal to or less than a predetermined DR frame waiting period, triggering generation of an IDR frame is restrained even when an IDR frame is generated at an arbitrarily indicated timing. Accordingly, it is possible to minimize an increase in a capacity required for a data buffer. Decoding of the first encoded data is not limited to the image decoder 111 and may be performed by other devices. In other devices, a frequency of an IDR frame and other I-frames may not be considered when a capacity required for a data buffer is set. Therefore, according to the present embodiment, it is possible to reduce the risk of exceeding data buffer capacities in other devices. In addition, when the DR frame waiting period exceeds the predetermined IDR frame waiting period, it is possible to immediately start decoding of the first encoded data without waiting for the next IDR frame.

Modified Examples

Figure 5:
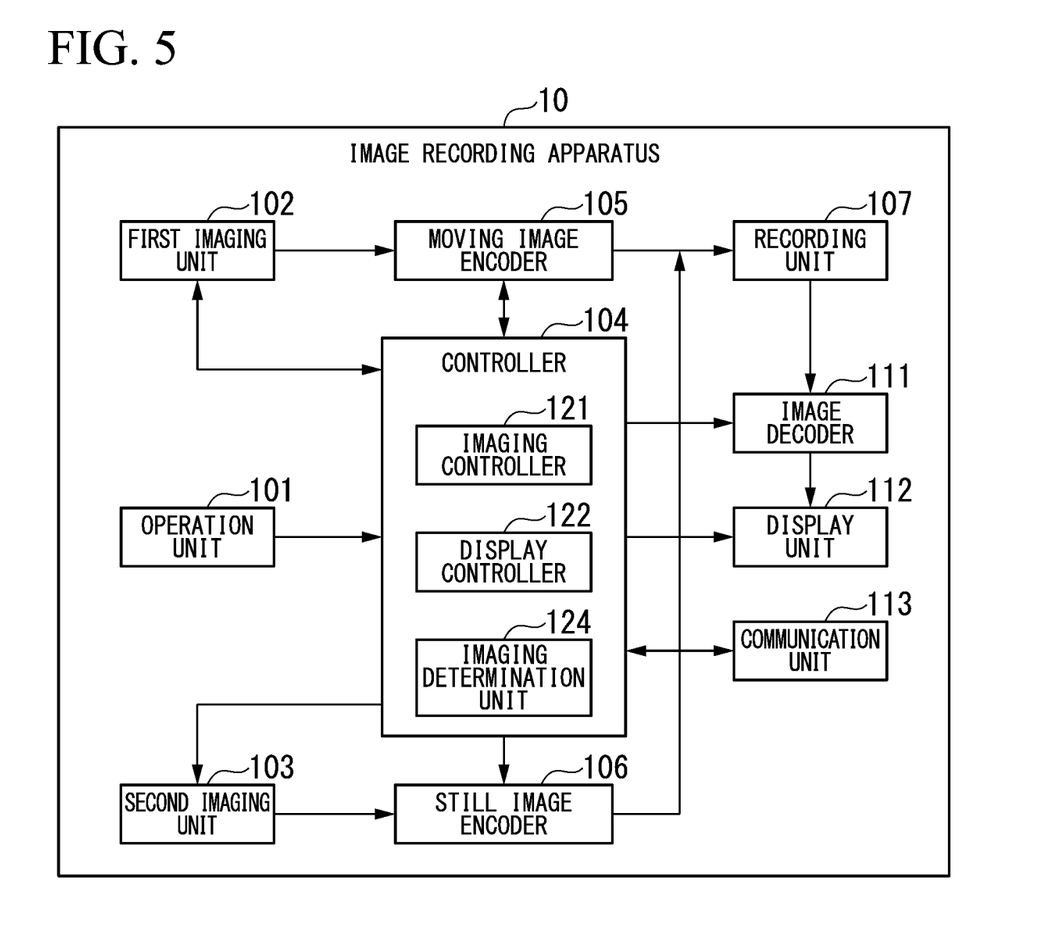
FIG. 5 is a block diagram showing another example of a functional configuration of the image recording apparatus according to the present embodiment.

Although a case in which a still image is instructed to be captured by a user operation has been exemplified in the above description, the present invention is not limited thereto. As shown in FIG. 5, the controller 104 may include an imaging determination unit 124.

The imaging determination unit 124 calculates an evaluation value representing suitability of an imaging target which is a first image represented by first image data input from the first imaging unit 102 and determines whether a second image needs to be captured according to whether the calculated evaluation value is greater than a predetermined threshold value of evaluation values. More specifically, the imaging determination unit 124 can calculate an evaluation value using a known pattern recognition process.

In the pattern recognition process, machine learning models such as a deep learning model and Adaboost can be used, for example. The deep learning model is a mathematical model constituting a neural network having an input layer, two or more intermediate layers and an output layer. The input layer, each intermediate layer and the output layer respectively have a plurality of input ports, nodes and output ports. Each input port outputs an input value input thereto to each node of a first intermediate layer as an output value. Each node of the intermediate layers calculates a composite value by linearly combining input values input from nodes of a lower layer and calculates an output value for the calculated composite value using a predetermined activation function. Here, an input port is regarded as a node of a 0-th layer. Each node of the intermediate layers outputs the calculated output value to each node of a higher layer. Here, an output port is regarded as a node of the highest intermediate layer. Each output port outputs a composite value obtained by linearly combining output values from the nodes of the highest intermediate layer as input values and outputs the composite value as an output value. For example, a Sigmoid function, a hyperbolic tangent (tan h) function or the like may be used as the activation function. Accordingly, the deep learning model includes a linear combination coefficient for linearly combining input values at nodes of the intermediate layers, a parameter of an activation function of each node, a linear combination coefficient for linearly combining input value at the output ports as parameters. In the following description, parameters constituting a machine learning model will be called model parameters.

When the imaging determination unit 124 calculates an evaluation value, the imaging determination unit 124 performs one or both of a first evaluation process and a second evaluation process which will be described below.

In the first evaluation process, the imaging determination unit 124 calculates a first imaging evaluation value using a first machine learning model on the basis of the first image data. The first imaging evaluation value is a value indicating a likelihood that a main subject represented by an evaluated image is a specific recognition target. Recognition target candidates may be a person, an animal, a flower, a ball used for a ball game, and the like, for example. Recognition target candidates may include the face of a person who has a specific expression (for example, smile). Model parameters constituting the first machine learning model are generated (learnt) before the first evaluation process is performed and set in the imaging determination unit 124. Image data indicating an image representing a subject is used as teacher data used for learning. Learning of the model parameters of the first machine learning model is performed by a model learning unit (not shown) (offline process). The image recording apparatus 10 may or may not include the model learning unit. The imaging determination unit 124 may acquire the model parameters of the first machine learning model from an external device (for example, a server device) separate from the image recording apparatus 10.

Learning of the model parameters of the first machine learning model includes the following steps S11 and S12 (not shown).

(Step S11) The model learning unit applies the first machine learning model to teacher data of an image representing an already known subject to calculate a first imaging evaluation value for each candidate for an already known recognition target. When the deep learning model is used as the first machine learning model, the model learning unit may determine an input value to each input port on the basis of a signal value of each pixel represented by the teacher data, for example. The model learning unit may use the signal value of each pixel as an input value or use an element value constituting an image feature quantity obtained on the basis of the signal value as an input value. For example, an edge direction of each pixel, a gradient of a signal value of each pixel or the like can be used as an image feature quantity. The model learning unit determines an output value from each output port which is calculated for the determined input value using the deep learning model as a first imaging evaluation value of a candidate for the recognition target which corresponds to the output port.

(Step S12) The model learning unit sequentially updates the model parameters until the first imaging evaluation value calculated with respect to a candidate for a recognition target of the same type as that of the already known subject represented by the teacher data becomes a predetermined first positive value (for example, 1) and the first imaging evaluation value obtained with respect to a candidate for a recognition target of a different type from the subject becomes a predetermined second positive value or less. A positive real number sufficiently closer to zero than the first positive value is used as the predetermined second positive value. Accordingly, as the first imaging evaluation value with respect to the candidate for the specific recognition target which is calculated using the deep learning mode increases, a likelihood that the subject is the recognition target increases. In model parameter learning, a sufficiently large number (for example, thousands to tens of thousands) of different pieces of teacher data is used.

The imaging determination unit 124 calculates the first imaging evaluation value by applying the first machine learning model to an evaluated image (online process). When the first machine learning model is the deep learning model, the imaging determination unit 124 determines an input value to each input port on the basis of a signal value of each pixel representing the evaluated image using the same technique as that used for learning. The imaging determination unit 124 calculates an output value from an output port of the deep learning model with respect to the input value as the first imaging evaluation value of a candidate for a recognition target corresponding to the output port.

The step of calculating the first imaging evaluation value may include a search procedure for searching for a region represented by a recognition target candidate and the shape of the candidate. For example, the search procedure may include a process for applying the first machine learning model to an evaluated image corrected by performing linear transformation on each candidate for a plurality of linear transformation coefficients set in advance using the linear transformation coefficients to calculate first imaging evaluation values and identifying a linear transformation coefficient that provides the largest first imaging evaluation value. This linear transformation coefficient depends on a region and a shape represented by a recognition target candidate. Accordingly, a region and a shape represented by a recognition target are identified by identifying a linear transformation coefficient.

When the second evaluation process is not performed, the imaging determination unit 124 identifies a recognition target candidate having the largest first imaging evaluation value among the first imaging evaluation values calculated for respective recognition target candidates as a recognition target and determines the first imaging evaluation value as an imaging evaluation value.

In the second evaluation process, the imaging determination unit 124 calculates an evaluation value indicating a degree to which the composition of an evaluated image is satisfactory. Factors that affect the quality of the composition may include the position of a region in which a main subject is represented with respect to the entire evaluated image including a background, the size of the region, colors of the main subject and the background, light and shade thereof, and the like, for example. The model learning unit learns model parameters of the second machine learning model used for the second evaluation process in advance and sets the model parameters in the imaging determination unit 124. Image data representing an image that expresses the main subject and the background is used as teacher data used for learning.

Learning of the model parameters of the second machine learning model includes the following steps S21 and S22 (not shown).

(Step S21) The model learning unit applies the second machine learning model to teacher data to calculate second imaging evaluation values. When the deep learning model is used as the second machine learning model, the model learning unit determines an input value to each input port on the basis of a signal value of each pixel represented by the teacher data. The model learning unit determines output values from output ports which are calculated for determined input values using the deep learning model as second imaging evaluation values.

(Step S22) The model learning unit updates the model parameters constituting the second machine learning model such that square values of differences between the second imaging evaluation values and a score assigned to the image represented by the teacher data become equal to or less than a predetermined square value. It is desirable that the predetermined square value be a positive value sufficiently close to 0. The score may be a value representing a quality that is subjectively determined by a person with respect to the image, for example. The score may be a two-level value which is 1 when the image quality is determined to be satisfactory and 0 when the image quality is not determined to be satisfactory. Further, the score may be a value of multiple levels of three or more levels which increases as the image quality is more satisfactory.

The imaging determination unit 124 applies the second machine learning model to the evaluated image to calculate second imaging evaluation values (online process). When the deep learning mode is used as the second machine learning model, the imaging determination unit 124 determines input values to respective input ports on the basis of signal values of pixels representing the evaluated image using the same technique as that used for learning. The imaging determination unit 124 calculates output values from output ports of the deep learning model with respect to the input values as second imaging evaluation values.

Although a case in which the second evaluation process includes a procedure of calculating second imaging evaluation values with respect to an evaluated image using the deep learning model as the second machine learning model independently of the first evaluation process is exemplified in the above example, the present invention is not limited thereto. The imaging determination unit 124 may include, as the second evaluation process, a procedure of calculating second imaging evaluation values on the basis of a region (hereinafter referred to as a target region) in which a recognition target that is a processing result of the first evaluation process is represented without using the second machine learning model. For example, the imaging determination unit 124 may determine second imaging evaluation values such that the second imaging evaluation values increase as a ratio of a portion of a target region included in a predetermined second evaluation region to the target region increases. Here, a region that has a center of gravity common with an evaluation region, a shape different from the evaluation region, and one side having a diameter (for example, 0.2 to 0.6 times one side of the evaluation region) less than that of the evaluation region is set in advance in the imaging determination unit 124 as the second evaluation region. Accordingly, second imaging evaluation values that increase when a target region of a subject set in advance is within the second evaluation region having a predetermined size (for example, the center of an evaluation region) is calculated. The second imaging evaluation values calculated in this manner may increase when a person that is a recognition target is closed up at the center of an evaluation region, for example.

In addition, second imaging evaluation data representing second imaging evaluation values may be set in advance in the imaging determination unit 124 for each set of the type of a recognition target, the size and position of a target region. The imaging determination unit 124 may specify a second imaging evaluation value corresponding to a set of the type of a recognition target, the size and position of a target region acquired in the first evaluation process with reference to the set second imaging evaluation data.

Further, when the first evaluation process is not performed, the imaging determination unit 124 determines calculated second imaging evaluation values as imaging evaluation values.

When both the first evaluation process and the second evaluation process are performed, the imaging determination unit 124 multiplies first imaging evaluation values and second imaging evaluation values by predetermined weighting factors corresponding thereto and calculates the sum of multiplied values obtained through multiplication as an imaging evaluation value.

In addition, although a case in which the threshold value ΔT of the IDR frame waiting period is constant is exemplified in the above description, the threshold value ΔT may be variable.

The imaging controller 121 may determine the threshold value ΔT such that the threshold value ΔT decreases as a motion quantity of a moving image of a first image of a frame at that point in time increases. Waiting period control data representing the threshold value ΔT associated with the motion quantity is set in advance in the imaging controller 121 and the threshold value ΔT associated with the motion quantity at that point in time can be identified.

The imaging controller 121 can employ a representative value of sizes of motion vectors calculated for respective blocks by the moving image encoder 105 in an encoding procedure as an index value of a motion quantity of a first image. Any one of the average, a mode and a maximum value of blocks in a frame can be used as a representative value.

Meanwhile, when the moving image encoder 105 detects a motion of a first image, the moving image encoder 105 performs block matching between each target block obtained by dividing the first image of a current frame and a block in a reference image. The moving image encoder 105 detects a block representing a shape most approximating to a shape represented by a target block as a corresponding block. In block matching, for example, a sum of absolute differences (SAD) can be used as an evaluation value indicating a degree of shape approximation. The SAD is an index value that indicates a higher degree of approximation when it is smaller. In addition, the moving image encoder 105 determines a positional deviation (variation) from a corresponding block within a reference image detected for each target block as a motion vector. A current frame and a reference image frame (hereinafter referred to as a reference frame) are not necessarily adjacent to each other and may be separated by two or more frames. The moving image encoder 105 normalizes the absolute value of a motion vector of each block with a frame spacing between a current frame and a reference frame and outputs a value obtained through normalization to the imaging controller 121 as the size of the motion vector.

Further, although a case in which the imaging controller 121 acquires motion vectors calculated by the moving image encoder 105 for respective blocks in an encoding procedure and uses a representative value of the sizes of the motion vectors as an index value of a motion quantity of a first image has been exemplified above, the present invention is not limited thereto. The controller 104 may include a moving image analyzer (not shown) which analyzes a motion (optical flow) of a first image represented by first image data input from the first imaging unit 102. For example, the moving image analyzer may use a first image of a previous frame (for example, a frame immediately prior to the current frame) as a reference image for each target block obtained by dividing the first image of the current frame and perform block matching between each target block and a block in the reference image to detect a block in the reference image which represents a shape most approximating to a shape represented by a target block as a corresponding block, as described above. The moving image analyzer determines a positional deviation from a corresponding block detected from each target block as a motion vector and outputs the size of the motion vector to the imaging controller 121. The imaging controller 121 obtains an index value of a motion quantity of the first image on the basis of the size of the motion vector determined by the moving image analyzer instead of the moving image encoder 105. Since inter-frame prediction is not performed with respect to I-pictures in an encoding procedure, a motion vector is not acquired. However, it is possible to quantify a motion quantity of a first image without depending on the moving image encoder 105 by including the moving image analyzer even when an encoding target frame is an I-picture.

In addition, when the image recording apparatus 10 includes the imaging determination unit 124, the imaging controller 121 may calculate a representative value of the sizes of motion vectors between blocks which overlap with a recognition region that is a region in which a main recognition target is represented as an index value of a motion quantity of a first image. The size of a motion vector corresponds to a displacement of a subject represented in the recognition region from a reference image to the current frame. The imaging determination unit 124 can identify the recognition region in a procedure of performing the aforementioned first evaluation process. The imaging determination unit 124 can output the identified recognition region to the imaging controller 121 and the imaging controller 121 can use information on the recognition region when calculating an index value. Accordingly, the imaging controller 121 can determine the threshold value ΔT on the basis of a motion quantity of a main subject.

Further, the imaging controller 121 may determine the threshold value ΔT such that the threshold value ΔT decreases as a movement quantity of the image recording apparatus 10 increases. Waiting period control data representing the threshold value ΔT associated with a movement quantity can be set in advance in the imaging controller 121 and the threshold value ΔT associated with the movement quantity at that point in time can be identified.

To detect a movement quantity, the image recording apparatus 10 may further include an acceleration detector (not shown). For example, the acceleration detector may be a 3-axis acceleration sensor. The acceleration detector detects an acceleration in each sensitivity axis direction and outputs the detected acceleration to the imaging controller 121. Then, the imaging controller 121 calculates a weighted moving average of accelerations in each sensitivity axis direction input from the acceleration detector as a gravity component. The imaging controller 121 subtracts the gravity component from an acceleration input from the acceleration detector to calculate a moving component of the acceleration and calculates a square root of the sum of squares of speed components in a sensitive axis direction obtained by performing time integration on the calculated moving component of the acceleration as a moving amount. Accordingly, the threshold value ΔT is determined on the basis of a movement quantity of the image recording apparatus 10.

Meanwhile, although the first imaging unit 102 and the second imaging unit 103 are separate in the examples shown in FIG. 1 and FIG. 5, it is desirable that the image recording apparatus 10 include at least one imaging unit (not shown). One imaging unit may be commonly used for capturing a first image which is a moving image and a second image which is a still image.

The moving image encoder 105 encodes first image data representing an image captured by one commonly used imaging unit as a moving image and the still image encoder 106 encodes second image data representing an image captured by the imaging unit as a still image.

In addition, the image recording apparatus 10 may include a sound collector, a sound encoder, a sound decoder and a reproduction unit (not shown). The sound collector collects sounds arrived thereat and outputs sound data representing collected sounds to the sound encoder. The sound encoder encodes the sound data input from the sound collector to generate sound encoded data. The sound encoder may associate the sound encoded data with first encoded data and record the associated data in the recording unit 107. When the controller 104 outputs a control signal representing reproduction of sounds corresponding to a first image to the sound decoder, the sound decoder reads sound encoded data indicated by the control signal from the recording unit. The sound decoder performs a decoding process on the read sound encoded data to generate sound data and outputs the generated sound data to the reproduction unit. The reproduction unit reproduces sounds on the basis of the sound data input from the sound decoder.

As described above, the image recording apparatus 10 according to the present embodiment includes the moving image encoder 105 which encodes images of respective frames forming a moving image, and the controller 104. A series of frames forming a moving image includes an intra-frame predictive frame encoded by the moving image encoder 105 through intra-frame prediction, and an inter-frame predictive frame encoded by performing inter-frame prediction with reference to images of other frames as reference images. In addition, the series of frames includes a non-reference frame which is not referred to in inter-frame prediction of a previous inter-frame predictive frame among intra-frame predictive frames at predetermined intervals. When a waiting period from an instruction point in time at which a still image is instructed to be captured to the next non-reference frame is equal to or less than a predetermined time, the controller 104 waits for the next non-reference frame, and when the waiting period exceeds the predetermined time, causes the moving image encoder to encode an image of the corresponding frame as a non-reference frame.

According to this configuration, when the waiting period is equal to or less than the predetermined time, the controller waits for the next non-reference frame, and the frame at the instruction point in time is not encoded as a non-reference frame. Accordingly, an increase in the amount of encoded data due to an increase in the number of non-reference frames is minimized even when frames are uniformly encoded as non-reference frames. Accordingly, a risk of abnormal image reproduction due to encoded data that exceeds a buffer capacity in a decoding procedure is reduced. Although first encoded data and second encoded data recorded by the image recording apparatus 10 may be decoded in other electronic apparatuses, such risk is likely to occur in other electronic apparatuses having a buffer capacity determined without consideration of specifications of the image recording apparatus 10.

In addition, the controller 104 may decrease the predetermined time as a motion quantity of a moving image increases.

Since a pattern variation from a point in time at which imaging is instructed to encoding as a non-reference frame increases as a motion quantity of a moving image increases, in general, a time permitted as the waiting period decreases. It is possible to record an image of a more intended non-reference frame by reducing the predetermined time in association with the permitted waiting time.

The moving image encoder 105 determines a motion vector for each block in an inter-frame predictive frame and the controller 104 determines a motion quantity thereof on the basis of the motion vector.

According to this configuration, it is possible to use a motion vector calculated in a moving image encoding procedure when a motion quantity is determined to minimize a throughput increase.

The controller 104 may recognize a predetermined subject from an image of each frame and determine a representative value of motion vectors of respective blocks in a display region of the subject as the motion quantity.

According to this configuration, a motion vector in a display region of a predetermined subject represented in a moving image can be used when a motion quantity is calculated, and thus the predetermined time is determined according to the motion of the subject.

Further, the image recording apparatus 10 may include an acceleration detector which detects an acceleration. The controller 104 determines a movement quantity of the image recording apparatus 10 on the basis of an acceleration detected by the acceleration detector and decreases the predetermined time as the movement quantity of the image recording apparatus 10 increases.

Since a pattern variation in a captured moving image increases as a movement quantity of the image recording apparatus 10 during capturing increases, a time permitted as the waiting time decreases. It is possible to record an image of a more intended non-reference frame by decreasing the predetermined time in association with the waiting time.

The controller 104 calculates an evaluation value indicating suitability of a moving image as a capturing target and determines whether a still image needs to be captured on the basis of the calculated evaluation value.

According to this configuration, suitability for a capturing target is quantitatively evaluated on the basis of the moving image and it is determined whether the still image needs to be captured on the basis of the evaluated suitability. Accordingly, an increase in the amount of encoded data due to an increase in the number of non-reference frames is minimized compared to a case in which frames are uniformly encoded as non-reference frames on the basis of determination results.

Meanwhile, in the above-described embodiment, whether to determine a value with respect to a threshold value (for example, threshold value ΔT) as "equal to or greater than"

or "equal to or less than" which includes the threshold value or "greater than," "less than," "exceed," "does not exceed," "above," "below," "under" or the like which does not include the threshold value is arbitrary in determination of the value with respect to the threshold value. For example, "equal to or greater than" may be switched to "greater than," "exceed" or "above" and "equal to or less than" may be switched to "less than," "do not exceed," or "under".

Further, a part of the image recording apparatus 10, for example, the controller 104, the moving image encoder 105, the still image encoder 106 and the image decoder 111, or an arbitrary combination thereof may be configured as a computer including a processor such as a CPU and processes instructed by commands described in a program stored in advance in a storage medium are performed to realize the functions thereof. In such a case, the functions may be realized by recording a program for realizing the control function in a computer readable recording medium, causing a computer system to read the program recorded in the recording medium and executing the program.

In addition, a part of the image recording apparatus 10 in the above-described embodiment may be realized in a configuration including members such as a large scale integrated (LSI) device, an application specific integrated circuit (ASIC) and a filed-programmable gate array (FPGA). Functional blocks of a part of the image recording apparatus 10 may be individually configured as processors or some or all thereof may be integrated and configured as a processor. In addition, a method for realizing integrated circuits is not limited to LSI and integrated circuits may be realized by dedicated circuits or general-purpose processors. Further, when a technology for realizing integrated circuits which replaces LSI and the like appears with the improvement of semiconductor technology, integrated circuit according to the technology may be used.

Although embodiments of the present invention have been described above in detail with reference to the drawings, specific configurations are not limited to the above-described embodiments and include designs and the like without departing from the spirit or scope of the present invention. Configurations described in the above-described embodiments can be arbitrarily combined.

EXPLANATION OF REFERENCES

10 Image recording apparatus
101 Operation unit
102 First imaging unit
103 Second imaging unit
104 Controller
105 Moving image encoder
106 Still image encoder
107 Recording unit
111 Image decoder
112 Display unit
113 Communication unit
121 Imaging controller
122 Display controller
124 Imaging determination unit

What is claimed is:

1. An image recording apparatus comprising:
a moving image encoder which encodes an image of each frame forming a moving image;
a still image encoder which encodes a still image; and
a controller,
wherein a series of frames forming the moving image includes intra-frame predictive frames encoded by the moving image encoder through intra-frame prediction and inter-frame predictive frames encoded through inter-frame prediction with reference to images of other frames as reference images, the series including a non-reference frame which is not referred to in inter-frame prediction of a previous inter-frame predictive frame at predetermined intervals in the intra-frame predictive frames, and
wherein the controller causes the still image encoder to encode a still image corresponding to a next non-reference frame when a waiting period from an instruction point in time at which a still image is instructed to be captured to the next non-reference frame is equal to or less than a predetermined time, causes the moving image encoder to encode an image of a current frame at the instruction point in time as a non-reference frame and causes the still image encoder to encode a still image corresponding to the current frame when the waiting period exceeds the predetermined time, or causes the still image encoder to encode a still image corresponding to the next non-reference frame when the waiting period is less than the predetermined time, and
the controller causes the moving image encoder to encode the image of the current frame as a non-reference frame and causes the still image encoder to encode the still image corresponding to the current frame when the waiting period is equal to or greater than the predetermined time.

2. The image recording apparatus according to claim 1, wherein the controller decreases the predetermined time as a motion quantity of the moving image increases.

3. The image recording apparatus according to claim 2, wherein the controller acquires a motion vector representing a motion of an image in at least some blocks of the current frame from other frames and determines the motion quantity on the basis of the motion vector.

4. The image recording apparatus according to claim 2, wherein the controller recognizes a predetermined subject from an image of each frame and determines a representative value of motion vectors of blocks in a display region of the subject as the motion quantity.

5. The image recording apparatus according to claim 1, comprising an acceleration detector which detects an acceleration,
wherein the controller determines a motion quantity of the image recording apparatus on the basis of the acceleration and decreases the predetermined time as the motion quantity of the image recording apparatus increases.

6. The image recording apparatus according to claim 1, wherein the controller calculates an evaluation value indicating suitability of the moving image as a capturing target and determines whether the still image needs to be captured on the basis of the evaluation value.

7. An image recording method in an image recording apparatus, comprising: a moving image encoding process for encoding an image, by a moving image encoder, of each frame forming a moving image; a still image encoding process for encoding a still image, by a still image encoder; and a control process, by a controller, wherein a series of frames forming the moving image includes intra-frame predictive frames encoded in the moving image encoding process through intra-frame prediction and inter-frame predictive frames encoded through inter-frame prediction with reference to images of other frames as reference images, the series including a non-reference frame which is not referred to in inter-frame prediction of a previous inter-frame predictive frame at predetermined intervals in the intra-frame predictive frames, and wherein the control process causes a still image corresponding to a next non-reference frame to be encoded in the still image encoding process when a waiting period from an instruction point in time at which a still image is instructed to be captured to the next non-reference frame is equal to or less than a predetermined time, causes an image of a current frame at the instruction point in time to be encoded as a non-reference frame in the moving image encoding process and causes a still image corresponding to the current frame to be encoded in the still image encoding process when the waiting period exceeds the predetermined time, or causes a still image corresponding to the next non-reference frame to be encoded in the still image encoding process when the waiting period is less than the predetermined time, and the control process causes the image of the current frame to be encoded as a non-reference frame in the moving image encoding process and causes the still image corresponding to the current frame to be encoded in the still image encoding process when the waiting period is equal to or greater than the predetermined time.

8. A non-transitory computer readable recording medium storing a program causing a computer of an image recording apparatus to execute: a moving image encoding procedure for encoding an image, by a moving image encoder, of each frame forming a moving image; a still image encoding procedure for encoding a still image, by a still image encoder; and a control procedure, by a controller, wherein a series of frames forming the moving image includes intra-frame predictive frames encoded by the moving image encoder through intra-frame prediction and inter-frame predictive frames encoded through inter-frame prediction with reference to images of other frames as reference images, the series including a non-reference frame which is not referred to in inter-frame prediction of a previous inter-frame predictive frame at predetermined intervals in the intra-frame predictive frames, and wherein the control procedure causes the still image encoder to encode a still image corresponding to a next non-reference frame when a waiting period from an instruction point in time at which a still image is instructed to be captured to the next non-reference frame is equal to or less than a predetermined time, causes the moving image encoder to encode an image of a current frame at the instruction point in time as a non-reference frame and causes the still image encoder to encode a still image corresponding to the current frame when the waiting period exceeds the predetermined time, or causes the still image encoder to encode a still image corresponding to the next non-reference frame when the waiting period is less than the predetermined time, and the control procedure causes the moving image encoder to encode the image of the current frame as a non-reference frame and causes the still image encoder to encode the still image corresponding to the current frame when the waiting period is equal to or greater than the predetermined time.

* * * * *